Jan. 15, 1929.  
C. W. CARTER  
1,699,221  
DEVICE FOR FRYING BACON AND THE LIKE  
Filed Jan. 26, 1928   2 Sheets-Sheet 1
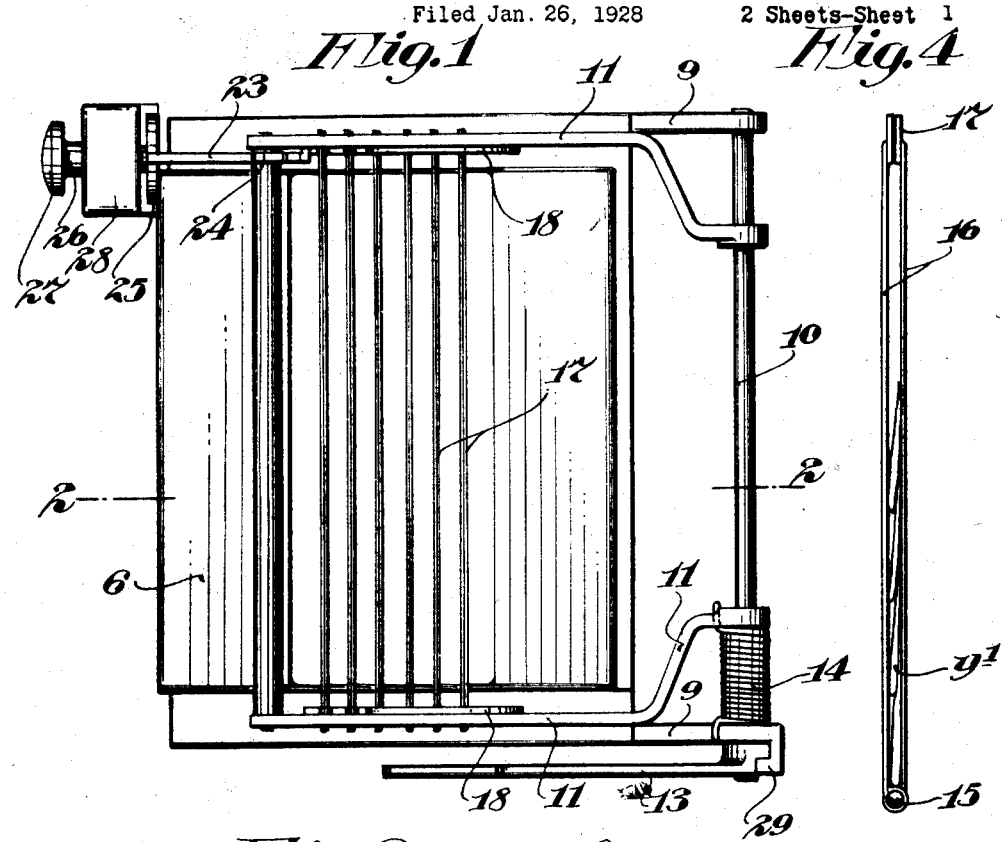
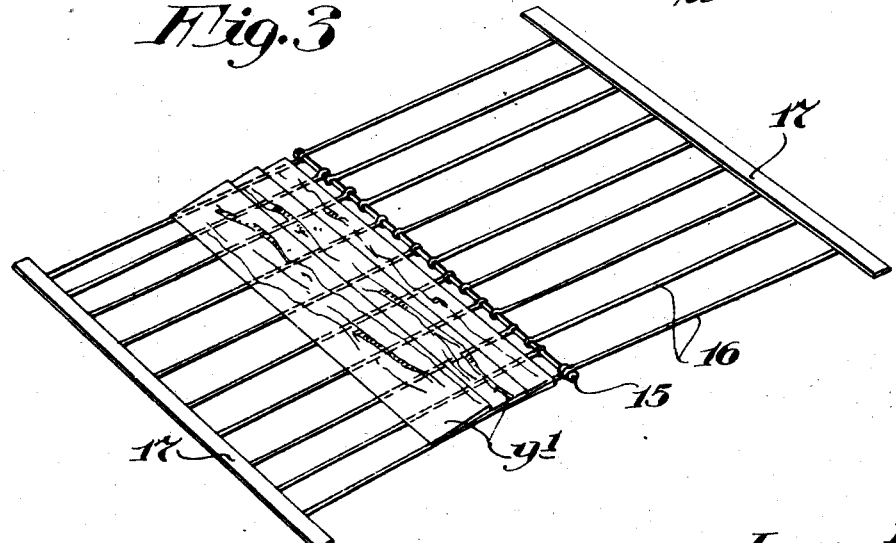
Inventor  
Clarence W. Carter  
By his Attorneys

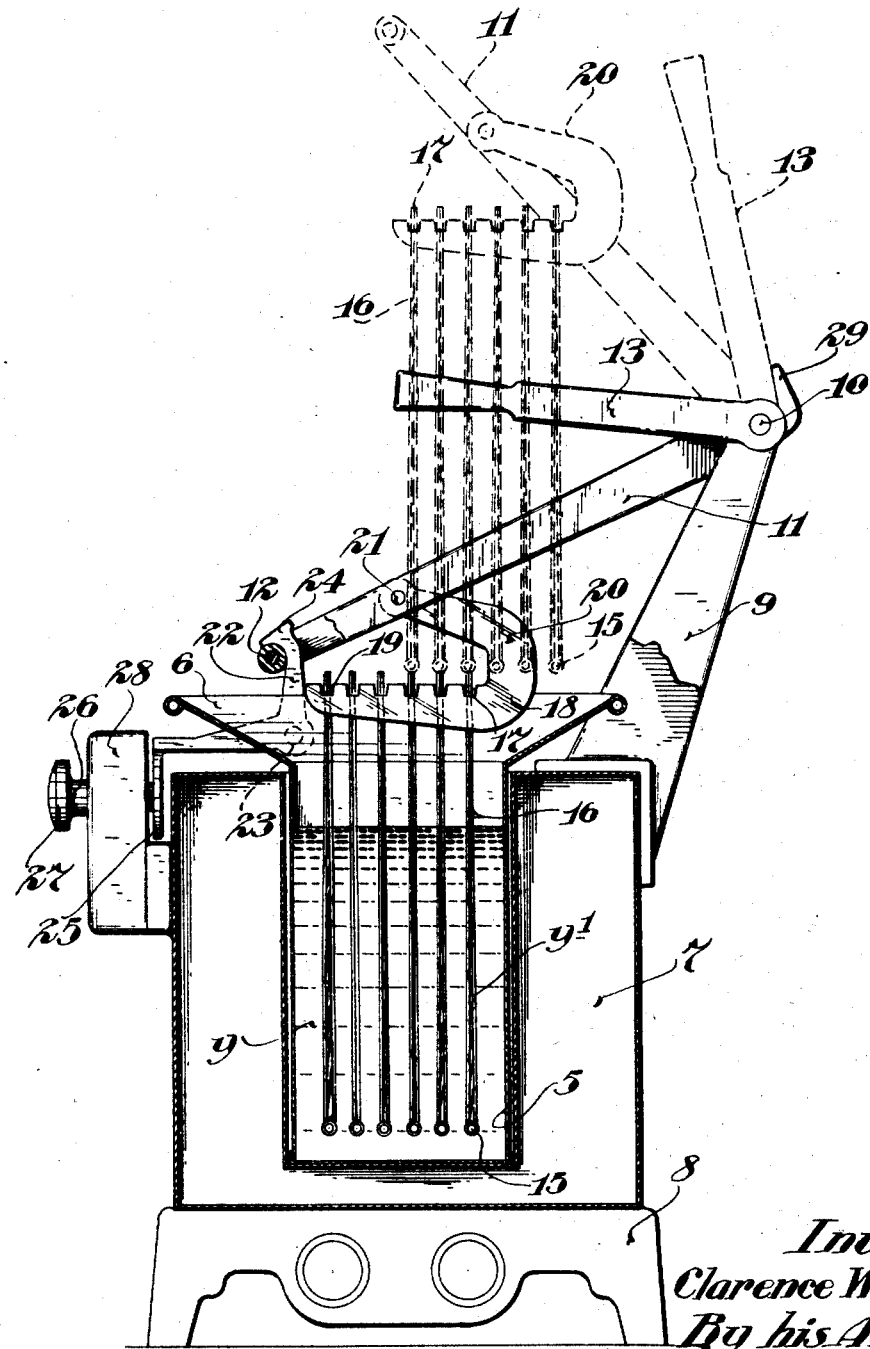

Patented Jan. 15, 1929.

1,699,221

UNITED STATES PATENT OFFICE.

CLARENCE W. CARTER, OF MINNEAPOLIS, MINNESOTA.

DEVICE FOR FRYING BACON AND THE LIKE.

Application filed January 26, 1928. Serial No. 249,556.

My present invention provides an extremely simple and highly efficient device or apparatus of large capacity for frying bacon or other thin strips of meat or the like in lard or grease. This device, in addition to a small tank or grease container, comprises a lifting frame, a hanger applied to and movable with said lifting frame, and a plurality of holding racks arranged to be detachably hung on and spaced by the hanger. The lifting frame is under yielding strain to move upward with its load when released, and for holding the same down in position to emerse the bacon in the grease of the tank, there is provided a latch that may be released either by manual operation or by a timed latch-releasing device. A device or apparatus of this character, because of its capacity for simultaneously frying a large amount of bacon or the like is especially adapted for use in restaurants where a large amount of bacon is used.

A commercial form of the device is illustrated in the accompanying drawings, wherein like characters indicate like parts throughout the several views.

Referring to the drawings:

Fig. 1 is a plan view of the complete device;

Fig. 2 is a vertical section taken on the line 2—2 of Fig. 1, some parts being shown in full;

Fig. 3 is a perspective showing one of the bacon-holding racks opened up; and

Fig. 4 is an edge elevation of one of the racks, showing the same as closed.

The lard or grease $y$, as shown, is contained in a small rectangular tank 5 having a hopper-like or flaring top 6. This tank, in the arrangement illustrated, is detachably seated in a recess formed in a hot air or gas chamber 7 mounted on a base 8. Air within the chamber 7 may be heated in any suitable way, as, for example, by electrical heating elements, by gas flame, or, in some instances, possibly by superheated steam. Only sufficient heat to cause the lard or grease to boil will, of course, be required.

For supporting the rack-lifting frame, bearing lugs 9 are rigidly secured to one side of the casing or outside shell of the chamber 7. The lifting frame, as shown, comprises a rock shaft 10, arms 11 rigidly secured on said rock shaft, and a tie rod or bar 12 rigidly secured to and tying together the free ends of said arms 11. The rock shaft 10 is journaled in the upper ends of the bearing lugs 9 and, at one projecting end, is provided with an operating handle or lever 13. A torsion spring 14, wound around the rock shaft 10 is, at one end, anchored to the adjacent lug 9 and, at its other end, to the adjacent arm 11 and exerts a force that tends to pivotally raise and hold upward the entire lifting frame.

For holding the bacon strips $y'$ preferably in slightly overlapped arrangement, as shown in part in Fig. 3, there is provided a plurality of bacon-holding racks, each of which racks, as shown, comprises a hinge rod 15, clamping wires 16 and metallic tie bars 17. These racks are two-part hinge structures made a good deal like a broiling iron, but in this arrangement, when the racks are closed to clamp and hold the bacon, the bars 17 will be brought close together, as shown in Fig. 4, this being important, as will presently appear.

The holder for supporting and suspending a plurality of these racks is, as shown, made up of two hanger brackets 18 formed with spaced notches 19 and having arms 20 that extend over the notched portions and terminate above the center of gravity of the respective racks and are pivoted at 21 to the corresponding arms 11 of the lifting frame. Here it is important to note that the notches 19 are of such width that, when the adjacent bars 17 of the closed racks are set into the same, the said notches not only hold the racks properly spaced and suspended in parallel arrangement, but hold the respective racks closed upon the bacon or strips contained within the racks.

For holding the frame 11 down, as shown in full lines in Fig. 2, with the bacon of the racks submerged in the grease, there is provided a latch, preferably as shown in the form of an L-shaped latch dog 22 pivoted to one of the frame arms 11 at 23. The upper arm of this latch dog has a hooked end 24 that detachably engages over the tie bar 12 of the lifting frame and holds the same in the position stated, against the tension of the spring 14. As a means for releasing the latch dog, I have shown an eccentric tripping disc or cam 25 secured to the short shaft 26 equipped at its outer end with a knob 27. Rotation of the shaft 26 and of the cam 25 may be produced manually by manipulation of the knob 27, but, as shown, said shaft 26 is passed through the casing 28 of the timed shaft-operating mechanism of any suitable construction, not necessary for the purposes of this case to consider. The numeral 29 indicates a stop on one of the lugs 9, which limits the upward movement of the lifting frame and parts carried thereby to the positions shown by dotted lines in Fig. 2, in which position it will be noted that the racks are lifted out of the grease but overlie either the body of the tank or the flaring top 6 thereof, so that all of the grease dripped from the bacon will run back into the tank.

The operation of the device or apparatus described is probably obvious, but, briefly described, is as follows:

The several racks, loaded with or containing the bacon, will be hung on the hanger brackets 20 while the lifting frame is raised, as shown by dotted lines in Fig. 2. Then, by pressing down on the handle 13, the tie bar 12 of said frame will be forced past and engaged by the hooked end 24 of the latch dog and said frame will then be latched down with the bacon and major portions of the racks emersed in the hot grease. When sufficient time for proper frying of the bacon has elapsed, the trip cam 25 will be rotated, either by hand or by timed action and, operating on the dog 22, will release the lifting frame and allow the latter, together with the hanger brackets and racks, to be automatically raised into the uplifted position shown by dotted lines in Fig. 2, under the automatic action of the spring 14. This spring should be of barely more than sufficient tension to lift the frame with its load. The bacon may be then allowed to stand for sufficient time to cause the surplus grease to drip therefrom, and the bacon, then in fairly dried condition, may be removed with the racks and then from the racks. The racks hold the strips of bacon in quite flat condition; that is, they prevent the same from curling up bodily, but will allow the same to assume a sort of a krinkled or slightly wave-like form, but, at any rate, the bacon thus cooked will be in good condition and shape for the making of sandwiches or for any other purpose.

It is highly important to note that, while the lifting lever changes its angle when moved vertically, the pivotally suspended hanger brackets 18 maintain horizontal positions, so that the holding racks are all maintained at the same elevation and in parallel positions.

The large amount of bacon that may be fried at one time by the use of this device recommend it for use at places where a large amount of bacon must be fried in a short time and where the frying of bacon at a minimum of attention and cost is a highly important factor.

What I claim is:

1. A device for frying bacon and the like comprising a tank for containing hot grease, vertically movable lifting means supported above said tank, and a rack for holding strips of bacon in substantially flat condition detachably suspended from said lifting means.

2. A device for frying bacon and the like comprising a tank for containing hot grease, vertically movable lifting means supported above said tank, a rack for holding strips of bacon in substantially flat condition detachably suspended from said lifting means, said lifting means being under yielding strain to rise, and a latch for releasably holding said lifting means down with said rack emersed in the grease of said tank.

3. A device for frying bacon and the like comprising a tank for containing hot grease, vertically movable lifting means supported above said tank, a rack for holding strips of bacon in substantially flat condition detachably suspended from said lifting means, said lifting means being under yielding strain to rise, a latch for releasably holding said lifting means down with said rack emersed in the grease of said tank, and a trip for releasing said latch.

4. A device for frying bacon and the like comprising a tank for containing hot grease, vertically movable lifting means supported above said tank, and a plurality of racks for holding strips of bacon in substantially flat condition suspended from said lifting means and supported thereby for parallel vertical movements into and out of the grease of said tank.

5. The structure defined in claim 4 in which said holding racks are formed with hingedly connected grid-like leaves having bars at the free edges of the leaves and the said lifting means having notches to receive the said bars to thereby hold the several racks spaced and closed.

6. A device for frying bacon and the like comprising a tank for containing hot grease, a lifting frame pivotally mounted for vertical movements above said tank, hanger brackets pivotally suspended from said frame and having horizontal notched portions, and a plurality of holding racks detachably hung from the notches of said hanger brackets.

7. The structure defined in claim 6 in which said holding racks are formed with hingedly connected grid-like leaves having bars at their free edges, the said bars being engageable with the notches of said hanger brackets and thereby held spaced and closed.

8. A device for frying bacon and the like comprising a tank for containing hot grease, a lifting frame pivotally mounted for vertical movements above said tank, hanger brackets pivotally suspended from said frame and having horizontal notched portions, a plurality of holding racks detachably hung from the notches of said hanger brackets, a spring tending to raise said lifting frame and its load, and a latch for holding the frame down with said racks emersed in the grease of said tank.

9. A device for frying bacon and the like comprising a tank for containing hot grease, a lifting frame pivotally mounted for vertical movements above said tank, hanger brackets pivotally suspended from said frame and having horizontal notched portions, a plurality of holding racks detachably hung from the notches of said hanger brackets, a spring tending to raise said lifting frame and its load, a latch for holding the frame down with said racks emersed in the grease of said tank, and a trip for said latch.

10. The structure defined in claim 8 in which said lifting frame is a rectangular structure, and in which said latch is engageable with the transverse member at the free portion thereof.

11. The structure defined in claim 9 in which said holding racks are formed with hingedly connected grid-like leaves having bars at their free edges, the said bars being engageable with the notches of said hanger brackets and thereby held spaced and closed.

12. The structure defined in claim 8 in which said lifting frame is an approximately rectangular structure comprising a rock shaft, arms and a transverse bar connecting the free ends of said arms and with which the latch is engageable, the shaft of said frame having a projecting handle whereby it may be readily forced downward.

In testimony whereof I affix my signature.

CLARENCE W. CARTER.